United States Patent
Edmonds et al.

(10) Patent No.: US 9,959,112 B2
(45) Date of Patent: May 1, 2018

(54) CUSTOMIZING A SOFTWARE APPLICATION BASED ON A USER'S FAMILIARITY WITH THE SOFTWARE APPLICATION

(71) Applicant: INTERNATIONAL BUSINESS MACHINES CORPORATION, Armonk, NY (US)

(72) Inventors: Paul M. R. Edmonds, Southampton (GB); Joe Pavitt, Chandler's Ford (GB); James E. Ravenscroft, Chandler's Ford (GB); James Sutton, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/070,513

(22) Filed: Mar. 15, 2016

(65) Prior Publication Data
US 2017/0269925 A1    Sep. 21, 2017

(51) Int. Cl.
*G06F 9/44*    (2006.01)
*G06F 9/445*   (2018.01)
*G06F 3/0484*  (2013.01)

(52) U.S. Cl.
CPC ............. *G06F 8/67* (2013.01); *G06F 3/0484* (2013.01)

(58) Field of Classification Search
CPC .......... G06F 8/38; G06F 15/18; G06F 9/4443; G06F 9/4446
See application file for complete search history.

(56) References Cited

U.S. PATENT DOCUMENTS

| 5,115,501 | A  | * | 5/1992  | Kerr ...................... G06F 9/4446 |
| 8,402,548 | B1 |   | 3/2013  | Muriello et al. |
| 8,538,947 | B2 |   | 9/2013  | Matejka et al. |
| 8,615,512 | B2 |   | 12/2013 | Wexler et al. |
| 8,732,662 | B1 | * | 5/2014  | Savant .................. G06F 9/4443 717/120 |
| 8,903,690 | B2 |   | 12/2014 | Bellamy et al. |
| 9,152,529 | B2 |   | 10/2015 | George et al. |
| 9,729,403 | B1 |   | 8/2017  | Rabe et al. |
| 9,805,427 | B2 |   | 10/2017 | Jemiolo et al. |

(Continued)

OTHER PUBLICATIONS

Sauro, "Measuring User Confidence in Usability Tests," Measuring U, Jun. 25, 2013, http://www.measuringu.com/blog/measuring-confidence.php, Printed on Oct. 28, 2015, pp. 1-4.

(Continued)

*Primary Examiner* — Duy Khuong T Nguyen
(74) *Attorney, Agent, or Firm* — Alexis N. Hatzis

(57) ABSTRACT

A software program is executed, the software program requiring one or more physical interactions with a user through an input/output (I/O) device, wherein each of the one or more physical interactions includes respective predefined dimensions indicating a proficiency in performing one of the one or more physical interactions. The one or more physical interactions are tracked. A familiarity profile for each of the one or more physical interactions is generated based on the respective predefined dimensions for each of the one or more physical interactions. The software program is customized based on the familiarity profile for each of the one or more physical interactions.

17 Claims, 7 Drawing Sheets

(56) References Cited

U.S. PATENT DOCUMENTS

| | | |
|---|---|---|
| 2008/0148150 A1 | 6/2008 | Mall |
| 2009/0089751 A1* | 4/2009 | Raikes ................. G06F 9/4446 717/120 |
| 2009/0311657 A1 | 12/2009 | Dodelson et al. |
| 2011/0154216 A1 | 6/2011 | Aritsuka et al. |
| 2011/0320943 A1 | 12/2011 | Wade et al. |
| 2012/0254853 A1 | 10/2012 | Aggarwal et al. |
| 2013/0159228 A1 | 6/2013 | Meijer et al. |
| 2013/0262365 A1 | 10/2013 | Dolbear et al. |
| 2014/0059131 A1 | 2/2014 | Goushterov |
| 2014/0075336 A1* | 3/2014 | Curtis ................. G06F 3/0481 715/753 |
| 2014/0089824 A1* | 3/2014 | George ................. G06F 8/38 715/762 |
| 2015/0121292 A1 | 4/2015 | Blanco et al. |
| 2015/0160931 A1 | 6/2015 | Glazer et al. |
| 2016/0283253 A1 | 9/2016 | Armstrong et al. |

OTHER PUBLICATIONS

Mell et al., "The NIST Definition of Cloud Computing", National Institute of Standards and Technology, Special Publication 800-145, Sep. 2011, pp. 1-7.

IBM, "List of IBM Patents or Patent Applications Treated as Related (Appendix P)," Sep. 26, 2017, p. 1-2.

Edmonds et al., "Customizing a Software Application Based on a User's Familiarity With the Software Program," Application and Drawings, filed Sep. 12, 2017, 31 Pages, U.S. Appl. No. 15/702,224.

\* cited by examiner

CUSTOMIZING A SOFTWARE APPLICATION BASED ON A USER'S FAMILIARITY WITH THE SOFTWARE APPLICATION

BACKGROUND OF THE INVENTION

The present invention relates generally to the field of tailoring content that is presented to a user of a computer system, and more particularly presenting customizing a software program for the user based on a metrics indicating the user's proficiency or familiarity with the computer system, the software program, as well as other software programs that are similar to the software program.

SUMMARY

Embodiments of the present invention provide systems, methods, and computer program products for customizing a software application based on a user's familiarity with the software program. A software program is executed, the software program requiring one or more physical interactions with a user through an input/output (I/O) device, wherein each of the one or more physical interactions includes respective predefined dimensions indicating a proficiency in performing one of the one or more physical interactions. The one or more physical interactions are tracked. A familiarity profile for each of the one or more physical interactions is generated based on the respective predefined dimensions for each of the one or more physical interactions. The software program is customized based on the familiarity profile for each of the one or more physical interactions.

DETAILED DESCRIPTION

A computer system, such as mobile device, can include a number of software programs (e.g., an operating system, a text messaging service, web browser, a picture sharing application, etc.) and can receive interactions. A user of a computer system can perform tasks by interacting with software programs of the computer system. A plurality of interactions can be performed by a user with a software program, such that the software program processes the interactions to accomplish a task.

Interactions performed by a user with a software program may indicate a user's familiarity with the software program. For example, when interacting with an e-mail application, a first user may send an e-mail by navigating a user interface (UI) of the e-mail application, providing content (e.g., a typed message, file attachments, picture attachments, etc.) for the e-mail, and designating at least one recipient for the e-mail. Whereas, a second user may first reference a help menu of the e-mail application, navigate the UI of the e-mail application for a longer time duration, provide content for the e-mail, and designate the recipient for the e-mail, but only provides a local portion of an e-mail address without the domain portion of the e-mail address. Accordingly, the first user's interactions indicate that the first user is familiar with the e-mail application, compared to the second user's interactions which indicate that the second user is not familiar with the e-mail application. The first user may find that tutorials and prompted help tooltips hinder on the first user's experience and usability when interacting with the e-mail application. Whereas, the second user may require additional tutorials and prompted help tooltips to improve on the second user's experience and usability when interacting with the e-mail application.

Familiarity profiles may be generated for users based on user integrations with an application. Familiarity profiles that are generated for the first user may indicate that the first user is familiar with the e-mail application, and familiarity profiles that are generated for the second user may indicate that the user is not familiar with the e-mail application. It may be advantageous to provide a software program to a user of a computer system that is customized based on a user's familiarity profile for a software program. Developers of software programs can use familiarity profiles as a feedback metric to improve future releases the software programs.

Embodiments of the present invention provide methods, systems, and computer program products for generating user familiarity profiles for each program software of a computer system. Embodiments of the present invention provide the user with program software that have been customized to improve a user's experience with the program software, based on the user's familiarity profiles.

Figure 1:
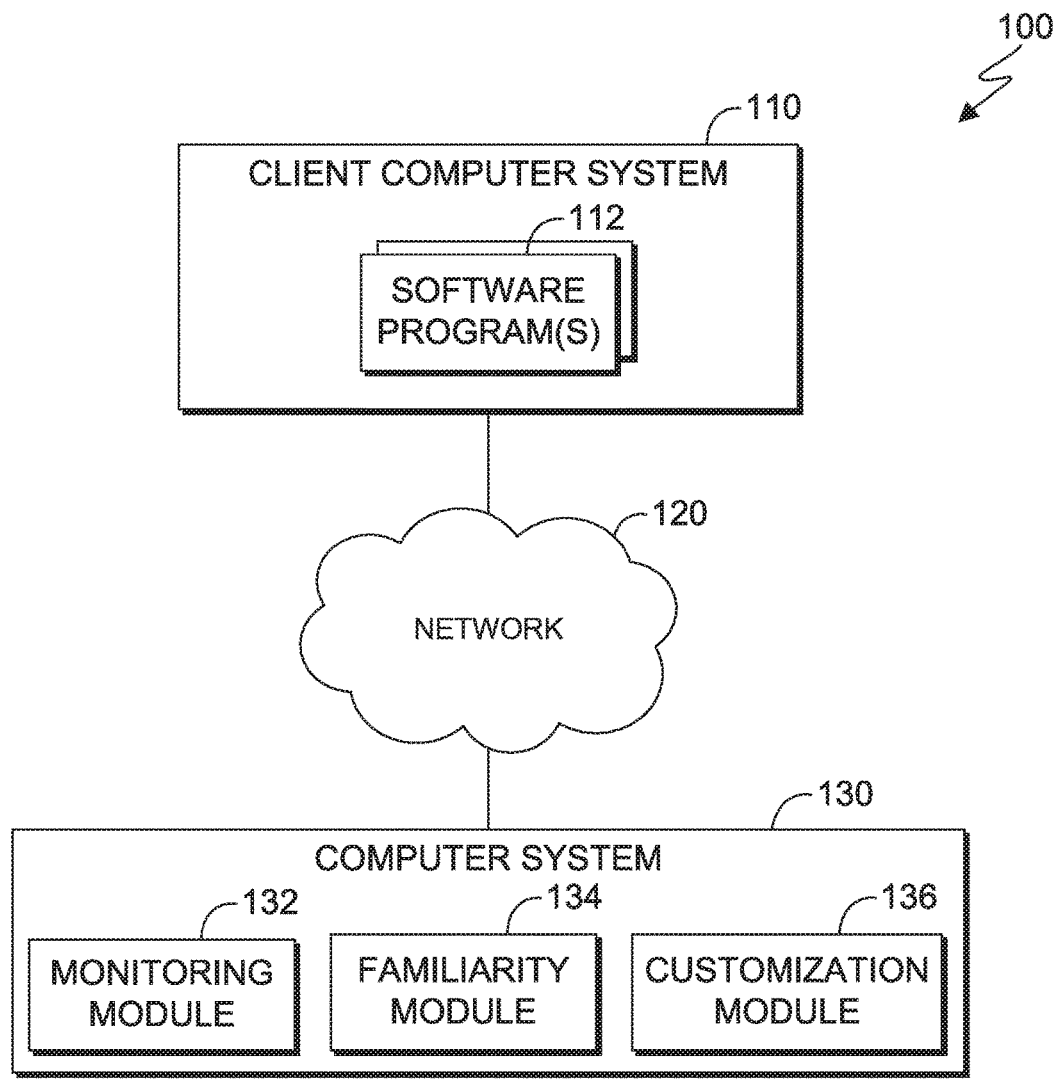
FIG. 1 is a block diagram of a customization system, in accordance with an embodiment of the present invention.

FIG. 1 is a functional block diagram of customization system 100, in accordance with an embodiment of the present invention. Customization system 100 includes client computer system 110 and computer system 130, interconnected via network 120. Client computer system 110 and computer system 130 can be desktop computers, laptop computers, specialized computer servers, or any other computer systems known in the art. In certain embodiments, client computer system 110 and computer system 130 represent computer systems utilizing clustered computers and components to act as a single pool of seamless resources when accessed through network 120. In certain embodiments, client computer system 110 and computer system 130 represent virtual machines. In general, client computer system 110 and computer system 130 are representative of any electronic devices, or combination of electronic devices, capable of executing machine-readable program instructions, as described in greater detail with regard to FIG. 5. Customization system 100 can include a greater or lesser number of computer systems similar to that of client computer system 110 and computer system 130 that are connected via network 120. In other embodiments, client computer system 110 and computer system 130 may be implemented in a cloud computing environment, as described in greater detail with regard to FIGS. 6 and 7.

Network 120 can be, for example, a local area network (LAN), a wide area network (WAN) such as the Internet, or a combination of the two, and include wired, wireless, or fiber optic connections. In general, network 120 can be any combination of connections and protocols that will support communications between client computer system 110 and computer system 130, in accordance with a desired embodiment of the invention.

Client computer system 110 represents a platform that processes interactions performed by a user, such that the user can interact with software programs 112 to accomplish desired tasks. An "interaction," or a physical interaction, as used herein, refers to a category of action performed by a user on client computer system 110 and components therein. For example, interactions can include: user input, help usage, error recovery, task completion, and tutorial completion, as described in greater detail below.

Client computer system 110 can be configured with a display device, such as a touch screen display, that displays a user interface (UI) of one of software programs 112. Client computer system 110 can be equipped with other peripheral devices, such as a keyboard, microphones, headphones and speakers, accelerometers and tilt-sensors, cameras, game controllers, image scanners, projectors, printers, digitizing functionality, and other input and output peripheral devices.

Software programs 112 represent computer programs configured to perform a group of coordinated functions, tasks, or activities for a user. Classifications of software programs 112 can include: operating systems that manage hardware resources of client computer system 110 and provide services to other software programs 112, business software (e.g., word processors, spreadsheets, etc.), enterprise software (e.g., resource planning systems, supply chain management software, etc.), content access software (e.g., social media applications, web browsers, file sharing applications, etc.), educational software, simulation software, media development software, and entertainment software (e.g., video games, media players, etc.).

Two software programs 112 may be considered related, if both software programs 112 are in the same category and have similar primary functions. In one example, two software programs 112, such as two different media players, may be considered related because the two software programs 112 are in the same category (i.e., entertainment software), and share similar primary functions (e.g., play recorded media). In another example, two software programs 112, such as a media player and a video game, may not be considered related, even though both software programs 112 are entertainment software, because they do not share similar primary functions. In one embodiment, two software programs 112 may be considered related if each of software programs 112 have the same or closely related developers. For example, a holding company may develop a first software program 112, such as a word processor, and a subsidiary company of the holding company may develop a second software program 112 such as a file sharing application. In this example, the word processor and the file sharing application may be considered related because the developers of the first and second software programs 112 are closely related (i.e., part of a conglomerate), even though both software programs 112 are under different categories.

Computer system 130 represents a platform that retrieves and processes information from client computer system 110. In this embodiment, computer system 130 includes monitoring module 132, familiarity module 134 and customization module 136. In another embodiment, components of computer system 130 can be included in client computer system 110. In yet another embodiment, components of computer system 130 can be a part of more than one computer system 130, such that each computer system 130 is configured to exchange information through network 120.

Monitoring module 132 represents program functionality for receiving and tracking interactions performed by a user on each of software programs 112. Monitoring module 132 monitors interaction dimensions for each interaction performed by a user on a particular software program 112. An "interaction dimension," or a predefined dimension as used herein refers to an attribute of an interaction, indicating a user's proficiency in performing the interaction.

For example, monitoring module 132 can monitor interaction dimensions for an interaction, such as user input, where the interaction dimensions may include: a user's typing speed, a user's typing accuracy, and a user's typing method (e.g., predictive text input, gestures, etc.). Monitoring module 132 can monitor interaction dimensions for an interaction, such as help usage, where the interaction dimensions may include: a frequency of referencing a help menu, time spent referencing the help menu, complexity of topics referenced in help menu. Monitoring module 132 can monitor interaction dimensions for an interaction, such as error recovery, where the interaction dimensions may include: a method used for error recovery, frequency of contacting technical support. Monitoring module 132 can monitor interaction dimensions for an interaction, such as task completion, where the interaction dimensions may include: a number of tasks completed, a number of functions utilized by a user, a time duration to complete each a pre-defined task. For example, a time duration may include a start time where one of software program 112 becomes a focus window of an operating system, and an end time where a pre-defined task is completed. Monitoring module 132 can monitor interaction dimensions for an interaction, such as tutorial completion, where the interaction dimensions may include: a time duration to complete a tutorial, a user's accuracy while completing a tutorial, a number of times a tutorial was referenced after an initial completion. In this embodiment, monitoring module 132 stores interaction dimension information in a storage repository of computer system 130.

Familiarity module 134 represents program functionality for generating a familiarity profile for each interaction performed by a user on each of software programs 112. A "familiarity profile," as used herein, indicates a user's familiarity for an interaction with one of software programs 112. In this embodiment, familiarity module 134 processes the stored interaction dimension information to generate a familiarity profile for each interaction performed by a user. For example, interaction dimension information for an interaction, such as user input, can indicate a user's typing speed is 45 words/minute, a user's typing accuracy is 78% (based on a number of times a typo was corrected either through autocorrect, or manually by the user), and a user's typing method involves one advanced function (e.g., predictive text input). Accordingly, familiarity module 134 processes stored interaction dimension information for each interaction to generate one familiarity profile.

Once familiarity module 134 generates a user's familiarity profile, familiarity module 134 generates an overall familiarity metric of the user for software program 112. An "overall familiarity metric," as used herein, refers to a value generated by familiarity module 134 that indicates a user's overall familiarity with one of software programs 112. For example, a user's overall familiarity metric for a first software program 112 may be greater than the user's second overall familiarity metric for a second software program 112, indicating that the user is more familiar with the first software program 112 compared to the second software program 112. In this embodiment, familiarity module 134 generates a user's familiarity metric for each software program 112 that the user interacts with, based on the user's familiarity profiles, as described in greater detail below. Familiarity module 134 can store generated familiarity profiles and generated overall familiarity metrics in a storage repository of computer system 130.

In one example, for a user interacting with a particular software program 112, familiarity module 134 may generate five familiarity profiles and an overall familiarity metric. A first of the five familiarity profiles may indicate the user's familiarity with user input, a second may indicate the user's familiarity with help usage, a third of may indicate the user's familiarity with error recovery, a fourth may indicate the user's familiarity with task completion, and a fifth may indicate a familiarity with tutorial completion. Familiarity module 134 can generate the user's overall familiarity metric by using the five familiarity profiles.

Customization module 136 represents program functionality for customizing software programs 112. A "customization," as used herein, refers to a modification to a UI graphical element of a particular software program 112, a modification to instructional content of the particular software program 112, and/or another modification applied to the particular software program 112, based on a user's familiarity profile for the particular software program 112.

Customization module 136 can reference a user's overall familiarity metric for a particular software program 112 in a storage repository of computer system 130 to determine an extent to customize the particular software program 112. For example, customization module 136 may reference a user's first and second overall familiarity metric for a first software program 112 and second software program 112, respectively. In this example, the user's first overall familiarity metric may be greater than the user's second overall familiarity metric, whereby customization module 136 determines that the second software program 112 may require more customization compared to the first software program 112.

In this embodiment, customization module 136 identifies one or more customizations to apply to a particular software program 112 for a user of client computer system 110, based on the user's familiarity profiles for the particular software program 112. For example, customization module 136 can provide additional instructional content via tooltips, tutorials, additional menus or other additional UI graphical elements in a particular software program 112 for users having low familiarity with the particular software program 112. Alternatively, customization module 136 can remove instructional content from the particular software program 112 for users having high familiarity with the particular software program 112.

In one example, customization module 136 may determine that a user has low familiarity with user input interactions on a particular software program 112, based on a user's familiarity profile for user input interactions. Customization module 136 can provide additional instructional content describing faster methods of user input for the particular software program 112, such as user input shortcuts. In another example, customization module 136 may determine that a user has high familiarity with user input interactions on a particular software program 112, based on a user's familiarity profile for user input interactions. Customization module 136 can remove additional instructional content, such that the user with high familiarity with user input interactions is not presented with instructional content that is already known by the user.

In one example, customization module 136 may determine that a user has low familiarity with help usage interactions on a particular software program 112, based on a user's familiarity profile for help usage interactions. Customization module 136 can provide additional instructional content describing how to properly navigate help menus for the particular software program 112. In another example, customization module 136 may determine that a user has high familiarity with help usage interactions on a particular software program 112, based on a user's familiarity profile for help usage interactions. Customization module 136 can remove additional instructional content, such that the user with high familiarity with help usage interactions is not presented with instructional content that is already known by the user, or can provide additional instructional content describing more advanced help usage functions.

In one example, customization module 136 may determine that a user has low familiarity with error recovery interactions on a particular software program 112, based on a user's familiarity profile for error recovery interactions. Customization module 136 can provide additional instructional content describing how to properly perform error recovery in the particular software program 112. In another example, customization module 136 may determine that a user has high familiarity with error recovery interactions on a particular software program 112, based on a user's familiarity profile for help usage interactions. Customization module 136 can remove additional instructional content, such that the user with high familiarity with error recovery interactions is not presented with instructional content that is already known by the user, or can provide additional instructional content describing more advanced error recovery functions.

In one example, customization module 136 may determine that a user has low familiarity with task completion interactions on a particular software program 112, based on a user's familiarity profile for task completion interactions. Customization module 136 can provide additional instructional content describing how to properly perform more advanced tasks and/or faster methods for performing basic tasks in the particular software program 112. In another example, customization module 136 may determine that a user has high familiarity with task completion interactions on a particular software program 112, based on a user's familiarity profile for task completion interactions. Customization module 136 can remove additional instructional content, such that the user with high familiarity with task completion interactions is not presented with instructional content that is already known by the user.

In one example, customization module 136 may determine that a user has low familiarity with tutorial completion interactions on a particular software program 112, based on a user's familiarity profile for tutorial completion interactions. Customization module 136 can provide additional instructional content describing how to properly complete a tutorial in the particular software program 112, an option to recomplete the tutorial, or provide a modified tutorial that focuses on the user's deficiencies. In another example, customization module 136 may determine that a user has high familiarity with tutorial completion interactions on a particular software program 112, based on a user's familiarity profile for tutorial completion interactions. Customization module 136 can remove an option to participate in a tutorial for the user having high familiarity with tutorial completion interactions.

In another embodiment, customization module 136 may transmit a user's overall familiarity metric and a user's familiarity profiles for a particular software program 112, to developers of the particular software program 112. The developers may use the received overall familiarity metric and familiarity profiles as feedback to address potential issues with the particular software program 112. Accordingly, customization module 136 may receive customizations from a developer of a particular software program 112, whereby customization module 136 applies the received customizations to the particular software program 112.

In yet another embodiment, customization module 136 may customize a particular software program 112, based on a user's familiarity profile for another software program 112 that is related to the particular software program 112. For example, customization module 136 may customize a picture sharing application for a user, based on the user's familiarity profiles for the picture sharing. In this example, if the user downloads a related software program 112 (e.g., another picture sharing application), customization module 136 can automatically customize the newly downloaded related software program 112, based on the user's previously generated familiarity profiles for first picture sharing application.

Figure 2:
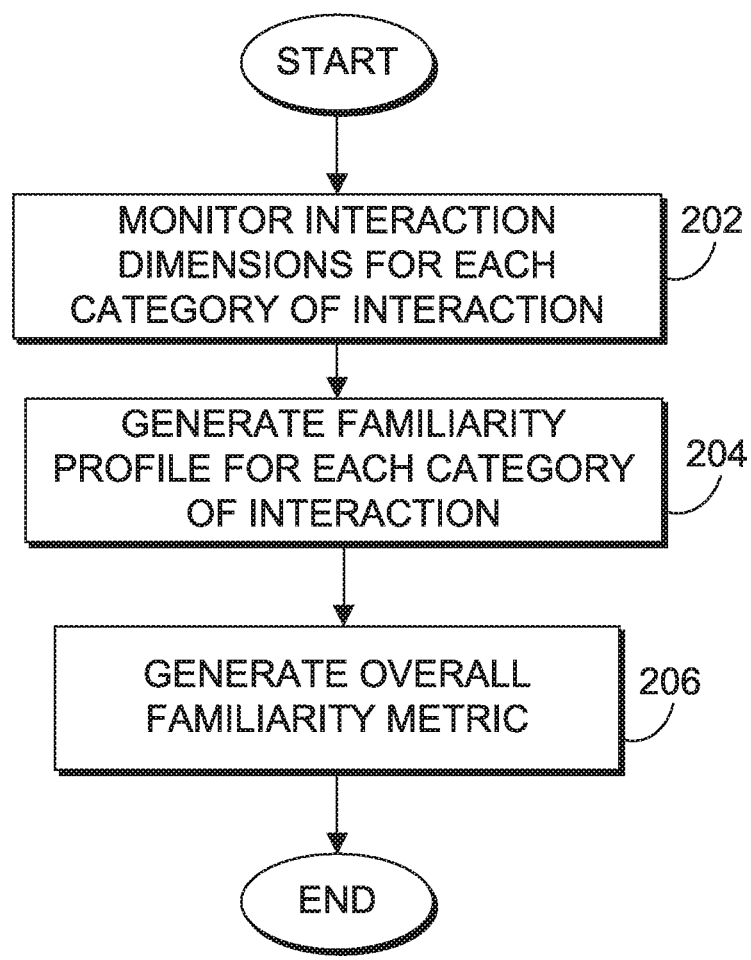
FIG. 2 is a flowchart illustrating operational steps for generating an overall familiarity metric for a particular software program, in accordance with an embodiment of the present invention.

FIG. 2 is a flowchart illustrating operational steps for generating an overall familiarity metric for a particular software program 112, in accordance with an embodiment of the present invention. Monitoring module 132 monitors interaction dimensions for each category of interaction performed by a user on the particular software program 112 (step 202). Monitoring module 132 can store the interaction dimension information for subsequent processing. Familiarity module 134 uses the stored interaction dimension information to generate a familiarity profile for each type of interaction (step 204). For example, familiarity module 134 can generate one familiarity profile for each of five categories of interaction (e.g., user input, help usage, error recovery, task completion, and tutorial completion). Familiarity module 134 uses the user's familiarity profiles to generate a user's overall familiarity metric for the particular software program 112 (step 206).

Figure 3:
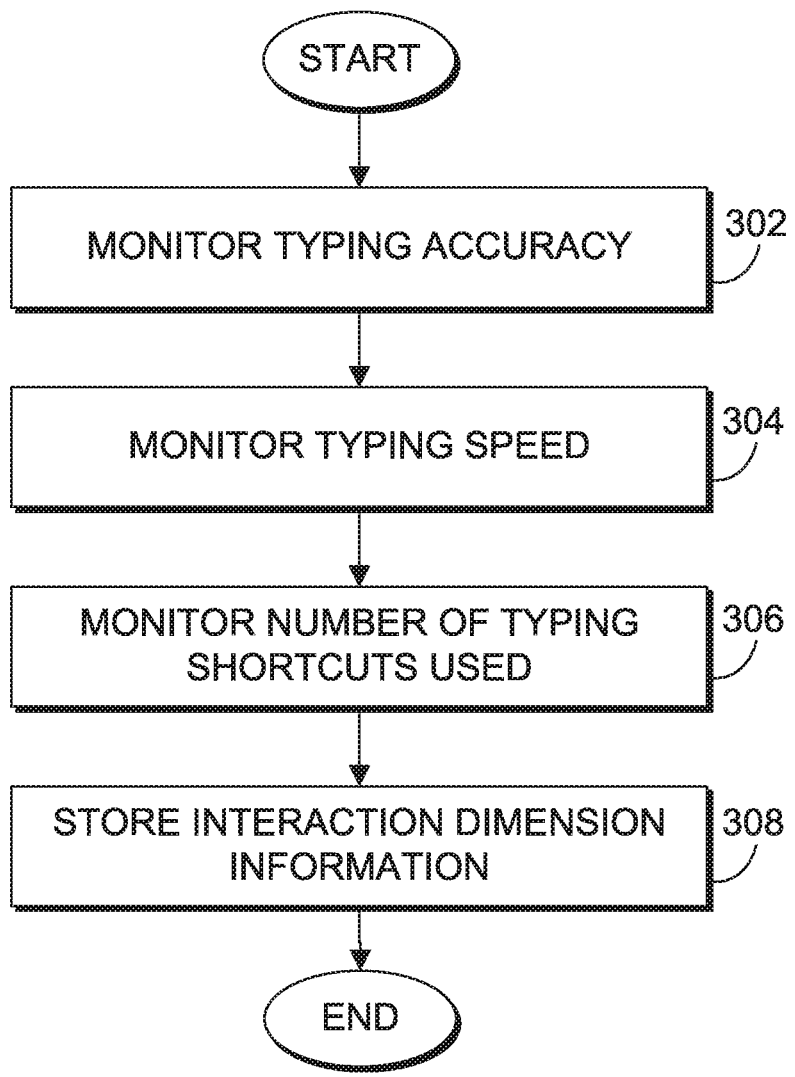
FIG. 3 is a flowchart illustrating operational steps for monitoring interaction dimensions for a category of interactions performed by a user on a particular software program, in accordance with another embodiment of the present invention.

FIG. 3 is a flowchart illustrating operational steps for monitoring interaction dimensions for a category of interactions performed by a user on a particular software program 112, in accordance with another embodiment of the present invention. Monitoring module 132 monitors a typing accuracy of the user (step 302). For example, a monitored typing accuracy for the user may be 71%. Monitoring module 132 monitors a typing speed of the user (step 304). For example, a monitored typing speed for the user may be 80 words per minute. Monitoring interval monitors a user's method of typing (step 306). For example, the user may use conventional user input instead of taking advantage of predictive text. Monitoring module 132 stores the interaction dimension information for subsequent analysis in a storage repository of computer system 130 (step 308).

Figure 4:
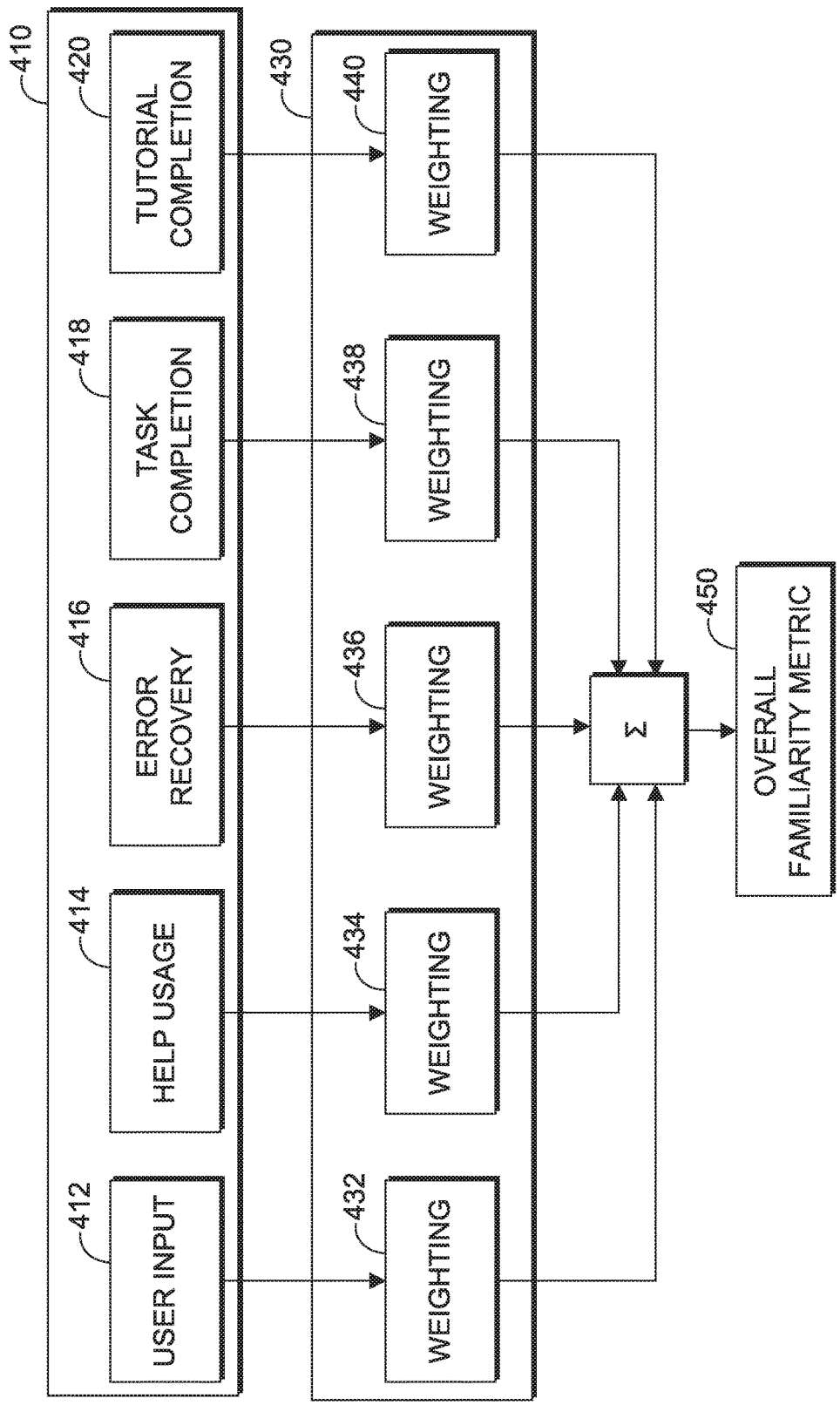
FIG. 4 is a block diagram for generating an overall familiarity metric, in accordance with another embodiment of the present invention.

FIG. 4 is a block diagram for generating overall familiarity metric 450, in accordance with another embodiment of the present invention. In this embodiment, familiarity profiles 410 include user input 412, help usage 414, error recovery 416, task completion 418, and tutorial completion 420. Familiarity module 134 applies weighting parameters 430 to each of familiarity profiles 410, such that weighting 432 is applied to user input 412, weighting 434 is applied to help usage 414, weighting 436 is applied to error recovery 416, weighting 438 is applied to task completion 418, and weighting 440 is applied to tutorial completion 420. For example, each of familiarity profiles 410 may be equally weighted. Accordingly, each of weighting parameters 430 applies a weight of 0.2 to each of familiarity profiles 410. Once each of familiarity profiles 410 is weighted with the respective weighting parameters 430, familiarity module 134 sums the weighted familiarity profiles 410, to generate overall familiarity metric 450.

Figure 5:
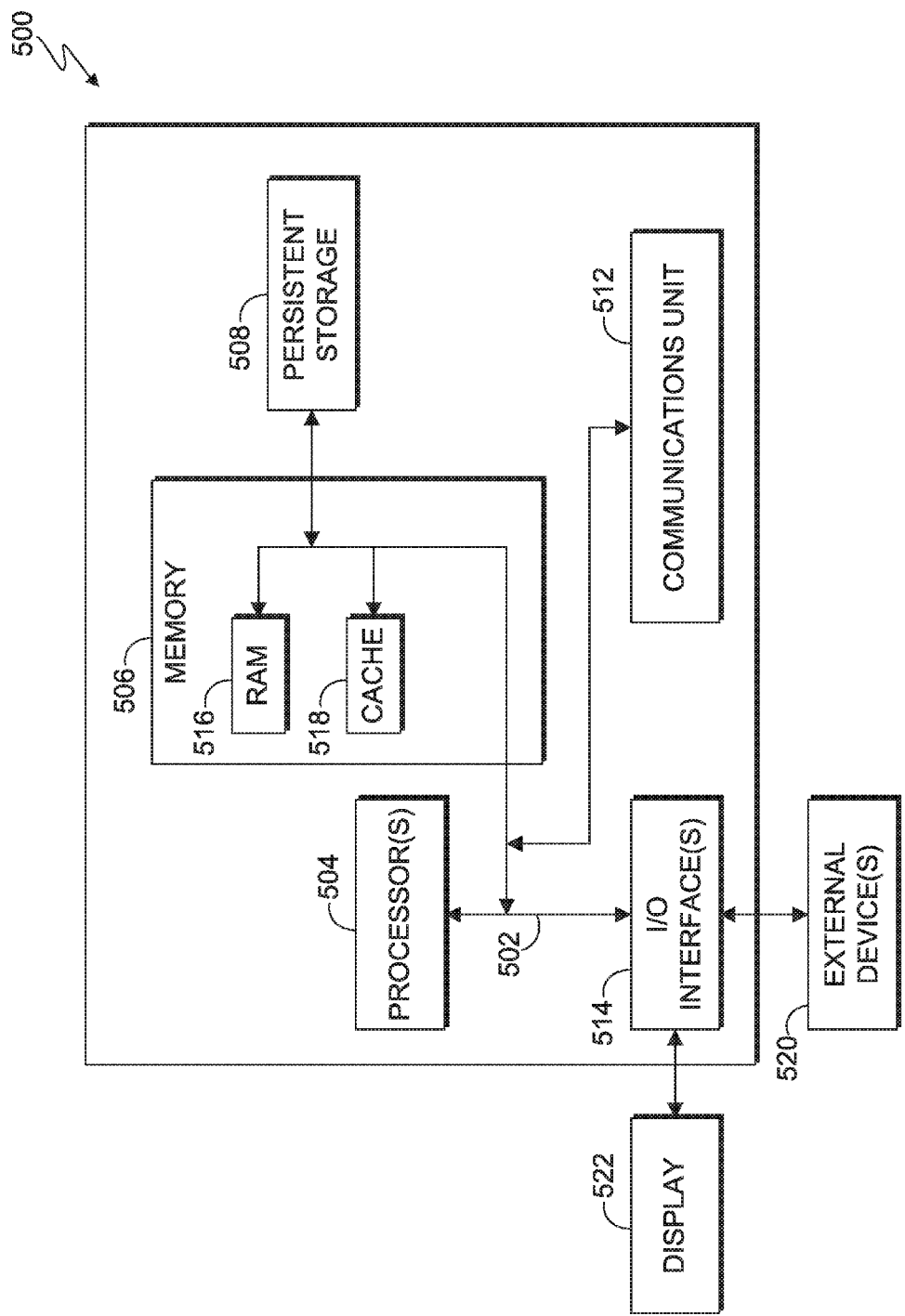
FIG. 5 is a block diagram of internal and external components of the computer systems of FIG. 1, in accordance with an embodiment of the present invention.

FIG. 5 is a block diagram of internal and external components of the computer systems of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 508, communications unit 512, and one or more input/output (I/O) interfaces 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media. Software is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer-readable storage medium that is also part of persistent storage 508.

Communications unit 512 provides for communications with other computer systems or devices via a network (e.g., network 120). In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 512 (e.g., via the Internet, a local area network or other wide area network). From communications unit 512, the software and data can be loaded onto persistent storage 508.

One or more I/O interfaces 514 allow for input and output of data with other devices that may be connected to computer system 500. For example, I/O interface 514 can provide a connection to one or more external devices 520, such as a keyboard, computer mouse, touch screen, virtual keyboard, touch pad, pointing device, or other human interface devices. External devices 520 can also include portable computer-readable storage media such as, for example, thumb drives, portable optical or magnetic disks, and memory cards. I/O interface 514 also connects to display 522.

Display 522 provides a mechanism to display data to a user and can be, for example, a computer monitor. Display 522 can also be an incorporated display and may function as a touch screen, such as a built-in display of a tablet computer.

Figure 6:
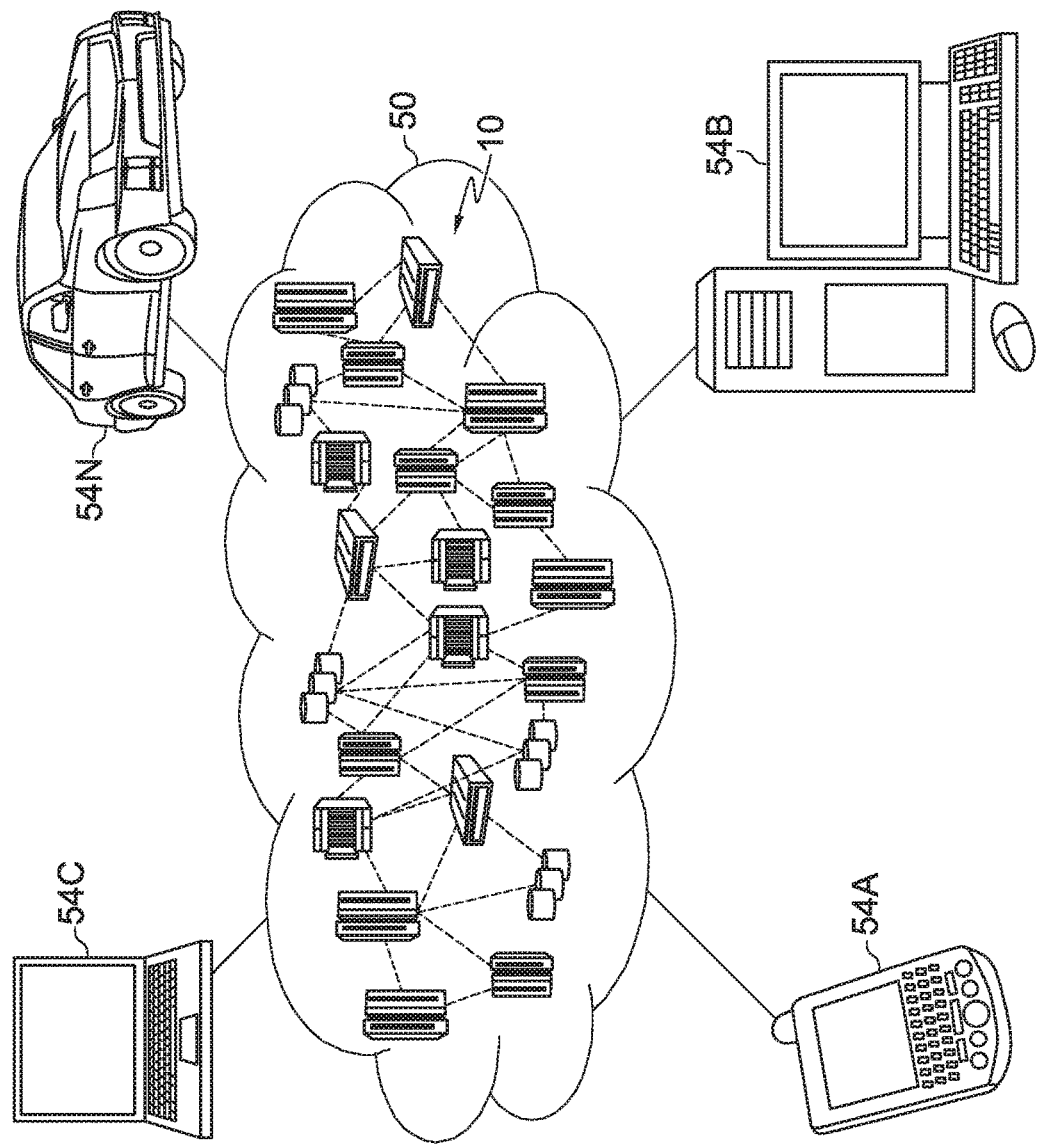
FIG. 6 depicts a cloud computing environment, in accordance with an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. The types of computing devices 54A-N shown in FIG. 7 are intended to be illustrative only and that cloud computing nodes 10 and cloud computing environment 50 can communicate with any type of computerized device over any type of network and/or network addressable connection (e.g., using a web browser).

Figure 7:
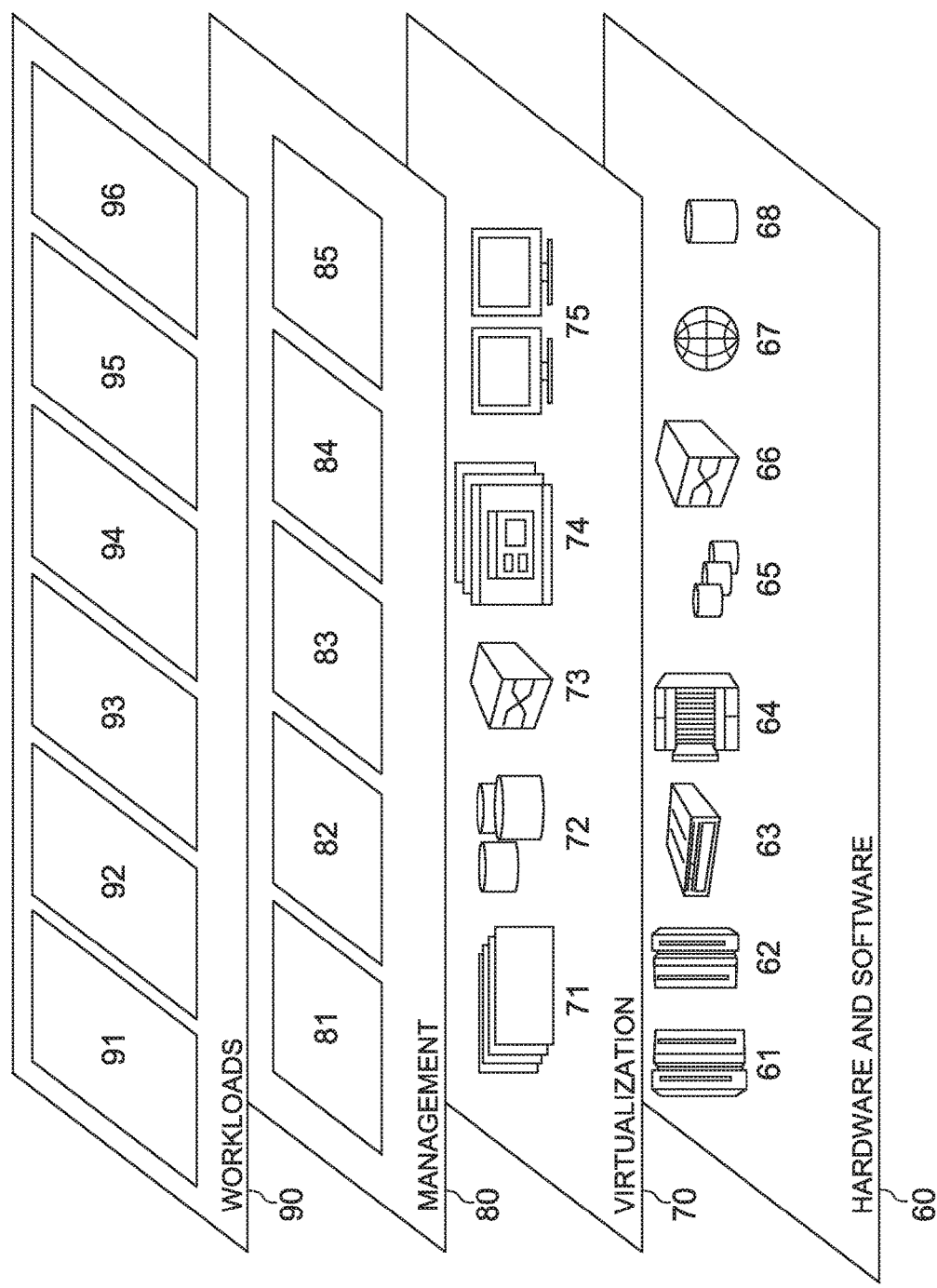
FIG. 7 depicts abstraction model layers, in accordance with an embodiment of the present invention.

Referring now to FIG. 7, a set of functional abstraction layers provided by cloud computing environment 50 (FIG. 6) is shown. The components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and customization system environment 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   executing, by one or more computer processors, a software program, the software program requiring one or more physical interactions with a user through an input/output (I/O) device, wherein each of the one or more physical interactions includes respective predefined dimensions indicating a proficiency in performing one of the one or more physical interactions;
   tracking, by the one or more computer processors, the one or more physical interactions;
   generating, by the one or more computer processors, a familiarity profile for each of the one or more physical interactions based on the respective predefined dimensions for each of the one or more physical interactions, wherein the familiarity profiles include user input, help usage, error recovery, task completion, and tutorial completion;
   applying, by the one or more computer processors, a weighting parameter to the familiarity profile for each of the one or more physical interactions to generate an overall familiarity metric indicating an overall proficiency with the software program, a related software program, and an extent of customization for the software program;
   customizing, by the one or more computer processors, the software program based on the familiarity profile for each of the one or more physical interactions;
   executing, by the one or more computer processors, a second software program, the second software program requiring one or more physical interactions with the user through the I/O device;
   determining, by the one or more computer processors, whether the second software program is related to the first software program; and
   responsive to determining that the second software program is related to the software program, customizing, by the one or more computer processors, the second software program based on the familiarity profile for each of the one or more physical interactions for the software program.

2. The method of claim 1, further comprising:
   generating, by the one or more computer processors, the overall familiarity metric based on the familiarity profile for each of the one or more physical interactions, indicating an overall proficiency with the software program, a related software program, and an extent of customization for the software program.

3. The method of claim 1, wherein the customization for the software program includes at least one of: providing instructional content, removing instructional content, and modifying a graphical element of a user interface (UI) of the software program.

4. The method of claim 1, wherein the one or more physical interactions include: user input interactions, help usage interactions, error recovery interactions, task completion interactions, and tutorial completion interactions.

5. The method of claim 4, wherein the predefined dimensions for the user input interactions include: a typing speed, a typing accuracy, and a number of typing shortcuts performed.

6. The method of claim 5, further comprising:
processing, by the one or more computer processors, information describing the predefined dimensions for the user input interactions with the software program;
generating, by the one or more computer processors, the familiarity profile for the user input interactions with the software program, based on the processed information describing the predefined dimensions for the user input interactions with the software program; and
responsive to determining that the familiarity profile for the user input interactions with the software program indicates a low proficiency for user input interactions with the software program, providing, by the one or more computer processors, additional instructional content for performing user input interactions with the software program.

7. A computer program product comprising:
one or more computer readable storage media and program instructions stored on the one or more computer readable storage media, the program instructions comprising:
program instructions to execute a software program, the software program requiring one or more physical interactions with a user through an input/output (I/O) device, wherein each of the one or more physical interactions includes respective predefined dimensions indicating a proficiency in performing one of the one or more physical interactions;
program instructions to track the one or more physical interactions;
program instructions to generate a familiarity profile for each of the one or more physical interactions based on the respective predefined dimensions for each of the one or more physical interactions, wherein the familiarity profiles include user input, help usage, error recovery, task completion, and tutorial completion;
program instructions to apply a weighting parameter to the familiarity profile for each of the one or more physical interactions to generate an overall familiarity metric indicating an overall proficiency with the software program, a related software program, and an extent of customization for the software program;
program instructions to customize the software program based on the familiarity profile for each of the one or more physical interactions;
program instructions to execute a second software program, the second software program requiring one or more physical interactions with the user through the I/O device;
program instructions to determine whether the second software program is related to the first software program; and
program instructions to, responsive to determining that the second software program is related to the software program, customize the second software program based on the familiarity profile for each of the one or more physical interactions for the software program.

8. The computer program product of claim 7, wherein the program instructions stored on the one or more computer readable storage media further comprise:
program instructions to generate the overall familiarity metric based on the familiarity profile for each of the one or more physical interactions, indicating an overall proficiency with the software program, a related software program, and an extent of customization for the software program.

9. The computer program product of claim 7, wherein the customization for the software program includes at least one of: providing instructional content, removing instructional content, and modifying a graphical element of a user interface (UI) of the software program.

10. The computer program product of claim 7, wherein the one or more physical interactions include: user input interactions, help usage interactions, error recovery interactions, task completion interactions, and tutorial completion interactions.

11. The computer program product of claim 10, wherein the predefined dimensions for the user input interactions include: a typing speed, a typing accuracy, and a number of typing shortcuts performed.

12. The computer program product of claim 11, wherein the program instructions stored on the one or more computer readable storage media further comprise:
program instructions to process information describing the predefined dimensions for the user input interactions with the software program;
program instructions to generate the familiarity profile for the user input interactions with the software program, based on the processed information describing the predefined dimensions for the user input interactions with the software program; and
program instructions to, responsive to determining that the familiarity profile for the user input interactions with the software program indicates a low proficiency for user input interactions with the software program, providing additional instructional content for performing user input interactions with the software program.

13. A computer system comprising:
one or more computer processors;
one or more computer readable storage media;
program instructions stored on the computer readable storage media for execution by at least one of the one or more processors, the program instructions comprising:
program instructions to execute a software program, the software program requiring one or more physical interactions with a user through an input/output (I/O) device, wherein each of the one or more physical interactions includes respective predefined dimensions indicating a proficiency in performing one of the one or more physical interactions;
program instructions to track the one or more physical interactions;
program instructions to generate a familiarity profile for each of the one or more physical interactions based on the respective predefined dimensions for each of the one or more physical interactions, wherein the familiarity profiles include user input, help usage, error recovery, task completion, and tutorial completion;
program instructions to apply a weighting parameter to the familiarity profile for each of the one or more physical interactions to generate an overall familiarity metric indicating an overall proficiency with the software program, a related software program, and an extent of customization for the software program;
program instructions to customize the software program based on the familiarity profile for each of the one or more physical interactions;
program instructions to execute a second software program, the second software program requiring one or more physical interactions with the user through the I/O device;

program instructions to determine whether the second software program is related to the first software program; and program instructions to, responsive to determining that the second software program is related to the software program, customize the second software program based on the familiarity profile for each of the one or more physical interactions for the software program.

14. The computer system of claim 13, wherein the program instructions stored on the one or more computer readable storage media further comprise:

program instructions to generate the overall familiarity metric based on the familiarity profile for each of the one or more physical interactions, indicating an overall proficiency with the software program, a related software program, and an extent of customization for the software program.

15. The computer system of claim 13, wherein the customization for the software program includes at least one of: providing instructional content, removing instructional content, and modifying a graphical element of a user interface (UI) of the software program.

16. The computer system of claim 13, wherein the one or more physical interactions include: user input interactions, help usage interactions, error recovery interactions, task completion interactions, and tutorial completion interactions.

17. The computer system of claim 16, wherein the predefined dimensions for the user input interactions include: a typing speed, a typing accuracy, and a number of typing shortcuts performed.

\* \* \* \* \*